(12) United States Patent
Lewis et al.

(10) Patent No.: US 8,588,827 B2
(45) Date of Patent: *Nov. 19, 2013

(54) SYSTEM AND METHOD FOR PROVIDING USER NAMES FOR NETWORK ADDRESSES

(71) Applicant: AT&T Mobility II LLC, Atlanta, GA (US)

(72) Inventors: John E. Lewis, Lawrenceville, GA (US); Justin McNamara, Dunwoody, GA (US); Fulvio Arturo Cenciarelli, Suwanee, GA (US); Jeffrey Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/875,816

(22) Filed: May 2, 2013

(65) Prior Publication Data
US 2013/0244706 A1    Sep. 19, 2013

Related U.S. Application Data

(63) Continuation of application No. 12/338,025, filed on Dec. 18, 2008, now Pat. No. 8,457,662.

(51) Int. Cl.
*H04W 4/00* (2009.01)
*H04M 3/42* (2006.01)
*H04M 1/725* (2006.01)

(52) U.S. Cl.
USPC .................. 455/466; 455/415; 455/412.1

(58) Field of Classification Search
USPC ........ 455/574, 403, 115.1, 343.2, 552.1, 500, 455/78, 127.1, 127.4, 127.5; 379/88.11, 379/142.04; 375/226, 316, 343, 375, 376; 370/512, 513, 514, 516, 518
See application file for complete search history.

(56) References Cited

U.S. PATENT DOCUMENTS

| | | | |
|---|---|---|---|
| 7,822,435 B2 * | 10/2010 | Takahashi et al. | 455/550.1 |
| 2004/0176067 A1 | 9/2004 | Lakhani et al. | |
| 2006/0242245 A1 * | 10/2006 | Christensen | 709/206 |
| 2008/0274758 A1 * | 11/2008 | Laumen et al. | 455/466 |
| 2010/0159963 A1 | 6/2010 | Lewis et al. | |

* cited by examiner

*Primary Examiner* — Kent Chang
*Assistant Examiner* — Nelson Rosario
(74) *Attorney, Agent, or Firm* — Woodcock Washburn LLP

(57) ABSTRACT

Methods and systems for providing user names for network addresses in messages such as SMS, MMS and EMS are disclosed. A data base is provided for storage in a mobile device that associates a user name with at least a portion of a network address. A system is provided for a mobile device that converts the network address transmitted with the message into a user name and displays the message with the user name.

11 Claims, 8 Drawing Sheets

| 31 | 30 | | 32 | 33 |
|---|---|---|---|---|
| Network Address | Service | | NA Fragment | User Name |
| 1010100028 | Service 1 | | 10101 | E-mail (non-billable) |
| 1012100028 | Service 2 | | 10121 | E-mail (billable) |
| 1020100031 | Service 3 | | 10201 | User Name 3 |
| 1030100555 | Service 4 | | 10301 | User Name 4 |
| 1050100030 | Service 5 | | 10501 | User Name 5 |
*Figure 3 (a)*      *Figure 3 (b)*
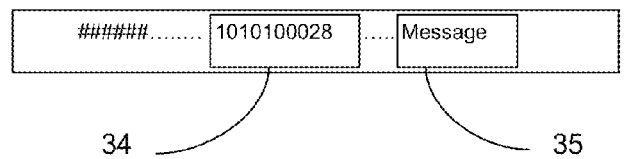
*Figure 3 (c)*
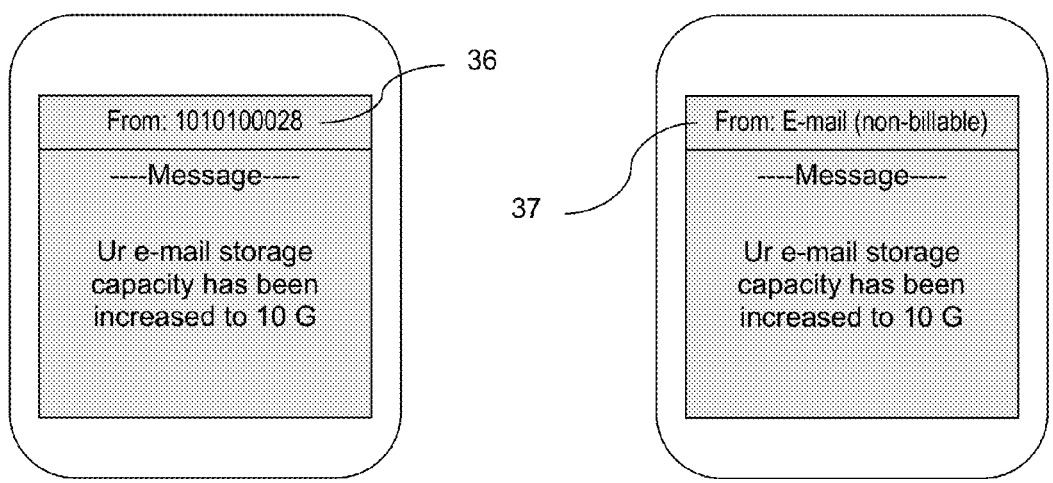
*Figure 3 (d)*      *Figure 3 (e)*

SYSTEM AND METHOD FOR PROVIDING USER NAMES FOR NETWORK ADDRESSES

CROSS-REFERENCE TO RELATED APPLICATIONS

The instant application is a continuation application of, and claims priority to, U.S. patent application Ser. No. 12/338,025, filed Dec. 18, 2008. U.S. patent application Ser. No. 12/338,025 is incorporated herein by reference in its entirety.

TECHNICAL FIELD

The present invention relates to mobile device services. More particularly, the present invention relates to providing mobile device SMS, MMS EMS or similar messages with a user name for a service network address.

BACKGROUND

Mobile devices are commonly used to exchange messages in many forms. Among those forms are messages that use standard Short Message Service (SMS). SMS provides the capability to send and receive short alphanumeric messages to and from mobile devices. Another form of message may use the standard Multimedia Messaging Service (MMS). MMS is a cellular communication standard that is used to transmit messages that include images, video, audio and other multi media objects. MMS is an extension of the SMS standard. Yet another type of messaging standard is Enhanced Messaging Service (EMS). EMS is based on standard SMS mechanisms. EMS takes advantage of the capability in SMS to include binary data in a Short Message (SM) before the text message itself. EMS provides the ability to send and receive objects such as sound, pictures, animation and formatted text. For the purpose of this disclosure, messages in SMS, MMS, EMS and similar formats are referred to as a Message Service Message (MSM).

Mobile service providers also provide a variety of services to their subscribers and utilize MSM as a way of communicating to their subscribers about these services. For example, a mobile service provider may offer ringtones and graphics that enable a subscriber to customize their wireless device to suit their tastes. Other services may include music downloads, games and a large number of applications such as mapping, traffic information, weather forecasts and sports reports.

The elements of a complete SMS (a type of MSM) message transaction include:
A header: identifies the type of message.
Service Center Timestamp
Originator Address: the phone number of the sender
Protocol Identifier
Data Coding Scheme
User Data Length: tells how long the message is
User Data: the message itself (140 bytes: 160 7-bit characters, or 140 8-bit characters).

The originator's address is usually the senders telephone number, and in the case of a message sent by a service or application provider, it may be the network address of the provider. For example, an e-mail service provider may have the number 1010100028 as its network address. Typically, this address will be displayed in the mobile device display in the "From" field. However, the network address does not clearly communicate to the subscriber the identity of the sender of the message.

There is a need for a way to identify the network address of a sender with a name that the subscriber can recognize.

SUMMARY

Systems and methods are provided herein for providing user names for network addresses for originators of SMS, MMS EMS and similar messages to be displayed in a mobile device. A data base is provided for storage in a mobile device that associates a user name with at least a portion of a network address. When the mobile device receives a message it converts the network address to a user name and displays the message with the user name.

These and other features and advantages of various exemplary embodiments of systems and methods according to this disclosure are described in, or are apparent from, the following detailed description of various exemplary embodiments of the systems and methods of this subject matter.

BRIEF DESCRIPTION OF THE DRAWINGS

Various exemplary embodiments of this invention will be described in detail, with reference to the following figures, wherein like numerals represent like elements, and wherein:

FIG. 3 (a)-(e) are non-limiting, exemplary illustration of the various information components and displays associated with an exemplary method of displaying a user name for a network address in an MSM message displayed in a mobile device.

DETAILED DESCRIPTION OF ILLUSTRATIVE EMBODIMENTS

Providers of services to mobile device users use MSM as a way of delivering information and content to the users. The providers of services use a network address as the Originator Address in the Transfer Protocol User Data Header (TP-UDH). These are usually a series of alphanumeric characters that are displayed in the mobile device.

Figure 1:
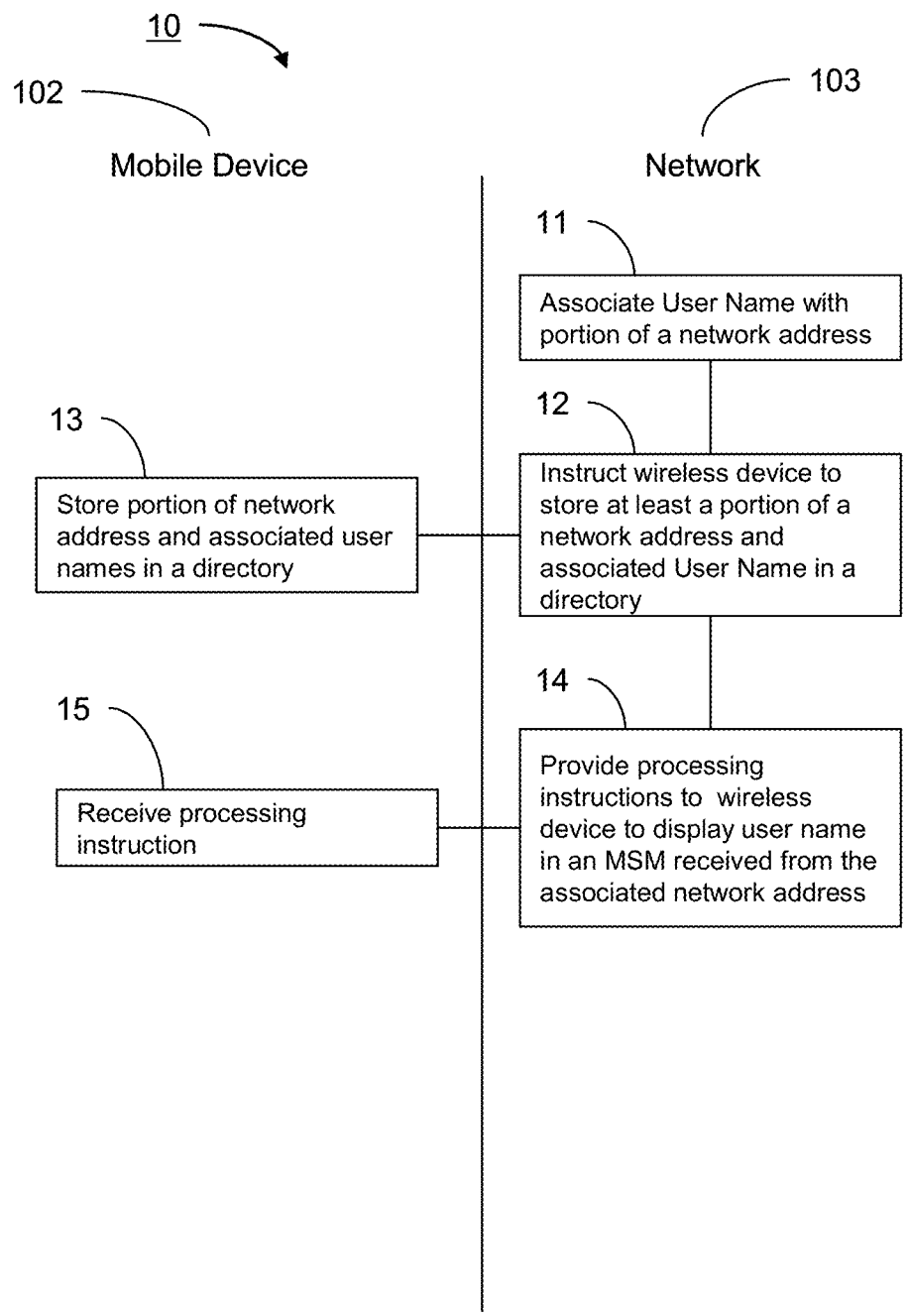
FIG. 1 is a flow chart of a non-limiting, exemplary method of providing a user name for a network address in an SMS display.

Illustrated in FIG. 1 is a method 10 of providing a User Name for a network address to a mobile device. At block 11, the service provider associates a User Name with a portion of a network address. For example, if the network address for an e-mail service is 1010100028, the User Name "e-mail" may be associated with the first five digits (i.e. 10101). In the method embodiment illustrated in FIG. 1, the service provider may instruct the wireless device to store at least a portion of the network address and associated User Name in a data base in a directory in a storage component of the mobile device (block 12). At block 13, the mobile device would receive the instructions and data and store the portion of the network addresses and associated User Name in a directory in a storage component of the mobile device. This information may be stored in a directory which may be hidden from the user. The service provider would provide processing instructions to the wireless device to enable the wireless device to display the User Name associated with the network address in a MSM received from that network address (block 14). At block 15 the mobile device would receive the processing instructions, typically in the form of an executable program application that can be stored in the mobile device.

Figure 2:
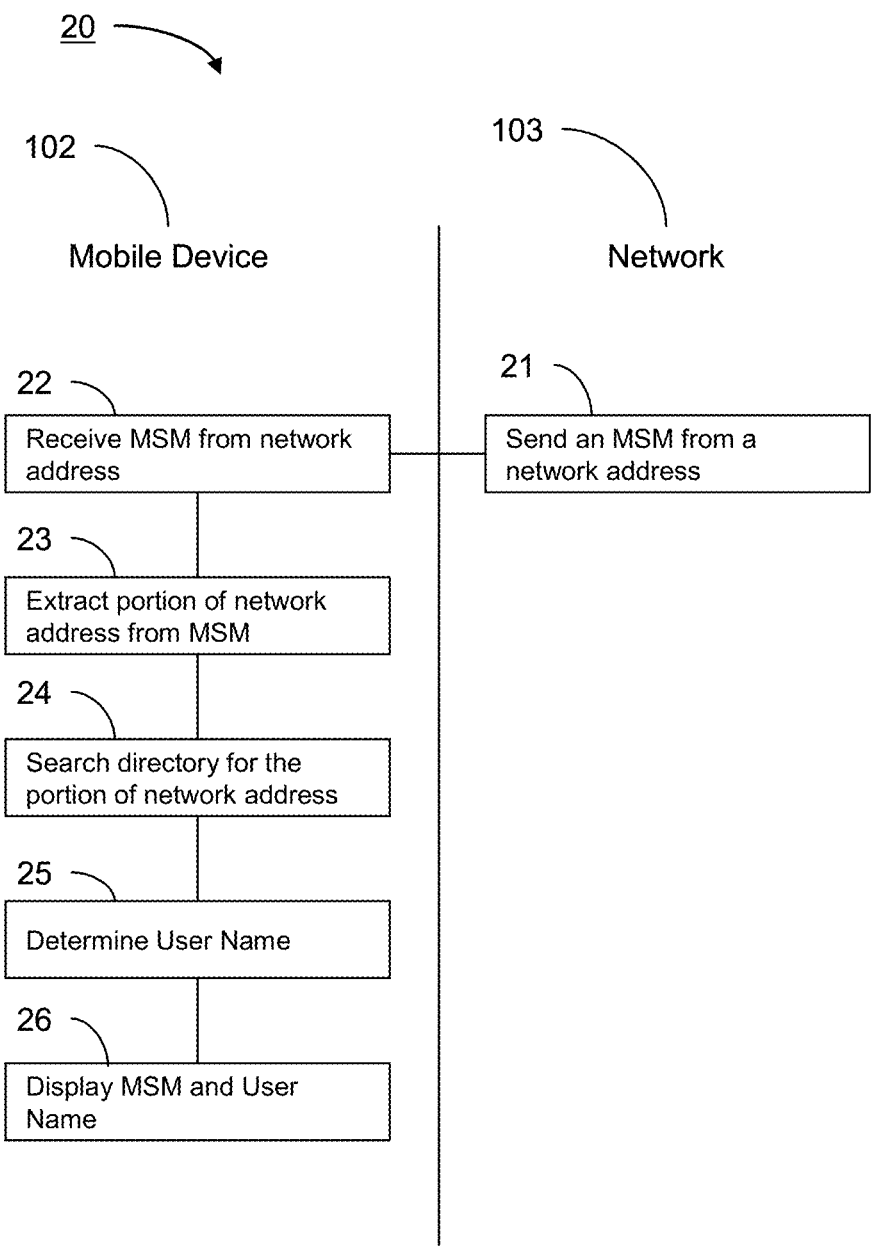
FIG. 2 is a flow chart of a non-limiting, exemplary method of displaying a user name for a network address in an SMS message displayed in a mobile device.

FIG. 2 illustrates the methods 20 of converting the network address in an MSM to a User Name for display in the Mobile Device. At block 21, a service provider sends an MSM to the mobile device of a user. An example of a message that a service provider may send may be a n SMS message such as "Ur e-mail storage capacity has been increased to 10 G." At block 22, the mobile device receives the MSM, in this case an SMS message that includes the full network address in the Originator Address field. At block 23, the mobile device would run the processing instructions previously received and stored (block 15 in FIG. 1). The processing instructions extract a portion of the network address from the MSM in block 23. It should be noted that the network portion of the address can vary in length based on what a network operator or telecommunication network carrier puts into a database. Additionally, the network operator may include wild cards inside the Network number. In this step, extraction is an example before Regular Expression a be used to match numbers to the network number. A regular expression is an expression of how a computer program should look for a specified pattern in text and then what the program is to do when each pattern match is found. Regular expressions are written in a formal language that is interpreted by a program that either serves as a parser generator or examines text and identifies parts that match the provided specification. At block 24 the mobile device searches the directory storing the data base of portions of network addresses associated with User Names for the portion of the network address that was extracted at block 23. From that search the mobile device would identify the User Name associated with the portion of the network address in the MSM, as illustrated in block 25. At block 26, that mobile device displays the MSM and the user name in the mobile device display.

FIG. 3 (*a*) illustrates the data components that may be associated with a plurality of services offered by one or more service providers. For each service 30, there is an associated Network address 31. The network address 31 would be included as the originator address in any MSM for the service provider. FIG. 3 (*b*) illustrates data components that may be included in the data base a directory in a storage component of the mobile device. The fields would include a portion or fragment of the network address 32 and an associated User name 33. FIG. 3 (*c*) illustrates a representative portion of the header information of an MSM, including the network address 34 of the originator of the MSM, and the appended message 35. FIG. 3(*d*) illustrates how a message may be displayed in the mobile device that does not use the presently described method of converting the network address to a User Name, and FIG. 3 (*e*) illustrates how the same message would be displayed using the method of this application. In FIG. 3 (*d*) the network address 36 would be displayed in the "From" field. To most users, the network address does not effectively communicate the source of the message. In FIG. 3(*e*), the User Name 37 is displayed in the "From" field, and the user is apprised that the message was sent by their e-mail service provider and is not billable.

The systems and methods for providing user names for network addresses may be implemented in a variety of mobile devices, such as wireless devices used in a variety of networks as described below.

Figure 4:
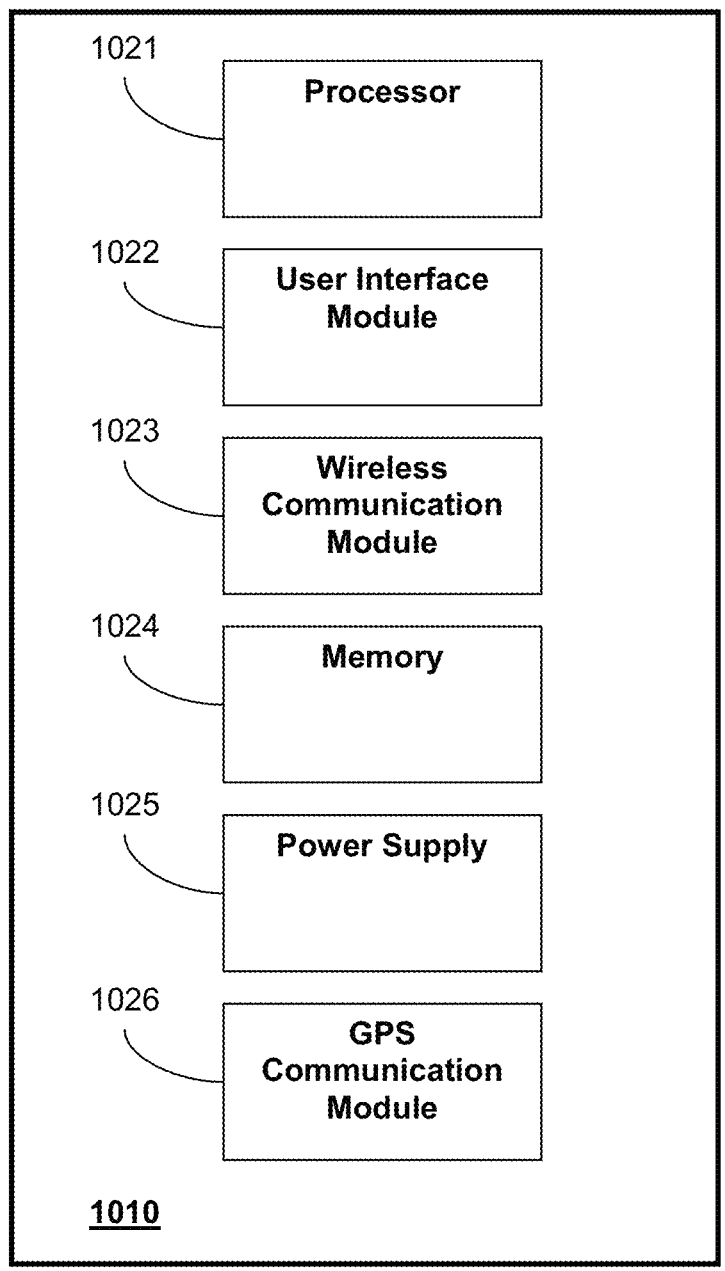
FIG. 4 is a block diagram of a non-limiting, exemplary wireless device that may be used in connection with an embodiment.

FIG. 4 illustrates an example wireless device 1010 that may be used in connection with an embodiment. References will also be made to other figures of the present disclosure as appropriate. For example, device 102 may be a wireless device of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to constructing, transmitting, receiving messages such as SMS and MMS messages, operating an address book, and determining alternate addresses, for example. User interface module 1022 may be any type or combination of hardware and/or software that enables a user to operate and interact with wireless device 1010, in one embodiment, to compose and read messages. For example, user interface module 1022 may include a display, physical and "soft" keys, voice recognition software, microphone, speaker and the like. Wireless communication module 1023 may be any type or combination of hardware and/or software that enables wireless device 1010 to communicate with, for example, network 103 or any other type of wireless communications network. Memory 1024 enables wireless device 1010 to store information, such as an address book, contacts information, or the like. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010.

GPS communication module 1026 may be any type or combination of hardware and/or software that enables wireless device 1010 to communicate with GPS location equipment. In one embodiment, wireless communication module 1023 may perform the functions of GPS communication module 1026. In an alternative embodiment, GPS communication module 1026 may be separate from wireless communication module 1023.

Figure 5:
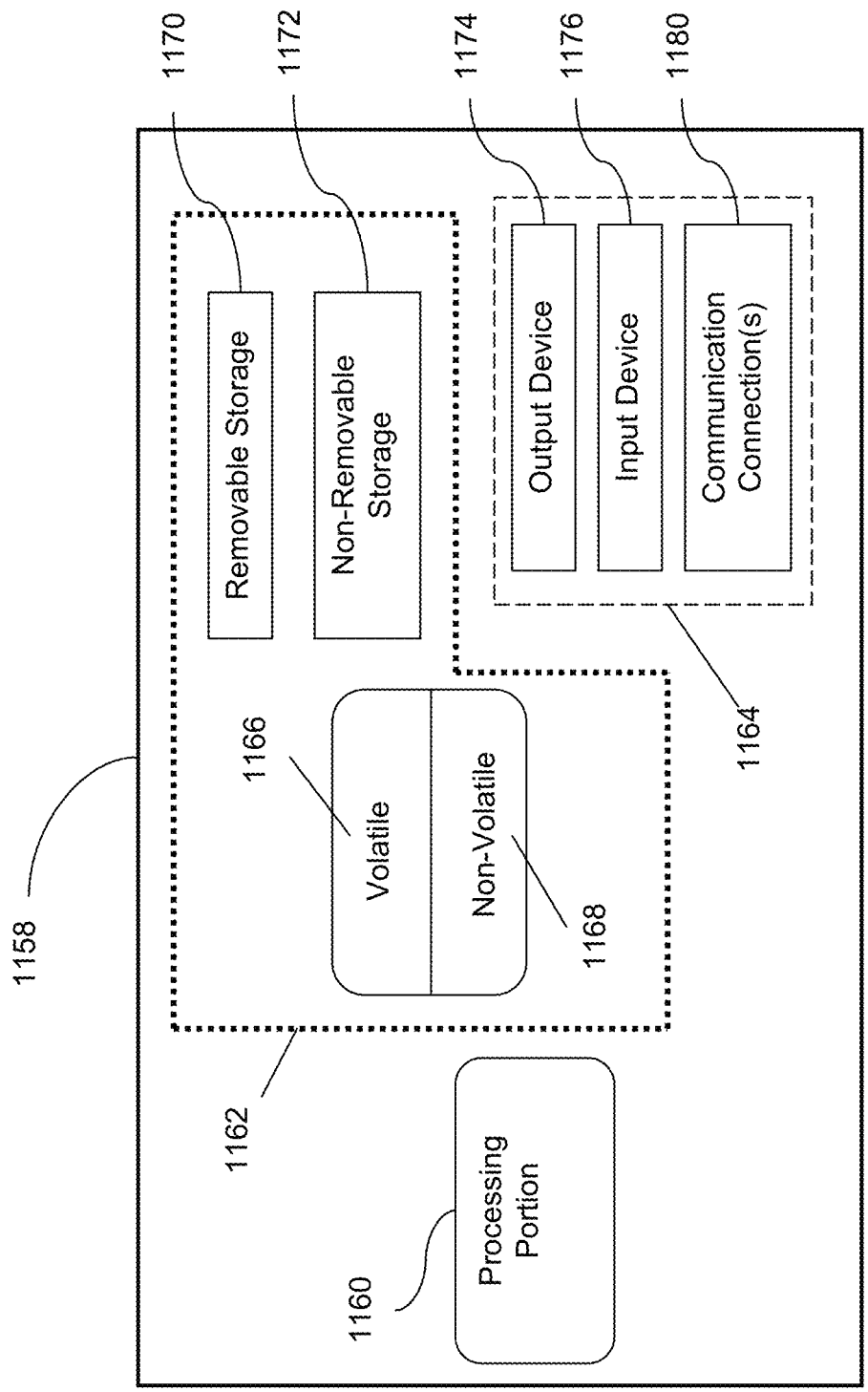
FIG. 5 is a block diagram of a non-limiting, exemplary processor in which the present subject matter may be implemented.

FIG. 5 is a block diagram of an example processor 1158 which may be employed in any of the embodiments described herein, including as one or more components of a communications device such as device 102 which may be a wireless communications device, as one or more components of communications network equipment or related equipment, such as any component of network 103, and/or as one or more components of any third party system or subsystems that may implement any portion of the subject matter described herein. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

The processor 1158 comprises a processing portion 1160, a memory portion 1162, and an input/output portion 1164. The processing portion 560, memory portion 562, and input/output portion 1164 are coupled together (coupling not shown in FIG. 5) to allow communications between these portions. The input/output portion 1164 is capable of providing and/or receiving components utilized to, for example, transmit/receive messages and/or transmit/receive data for an address book or contact list.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing messages, contact information and numbers, determining alternate contacts, etc. For example, as described above, the memory portion is capable of storing an address book and software capable of operating the address book and determining alternate numbers. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through network 103. Communications connection(s) 1180 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

Network 103 may comprise any appropriate telephony radio network, or any other type of communications network, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how IP cellular broadcast may be used with stationary and non-stationary network structures and architectures. It can be appreciated, however, that systems for providing user names for network addresses such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the techniques of the utilization of SMS, MMS, and/or cellular broadcast can be applied independently of the method of data transport, and do not depend on any particular network architecture, or underlying protocols.

Figure 6:
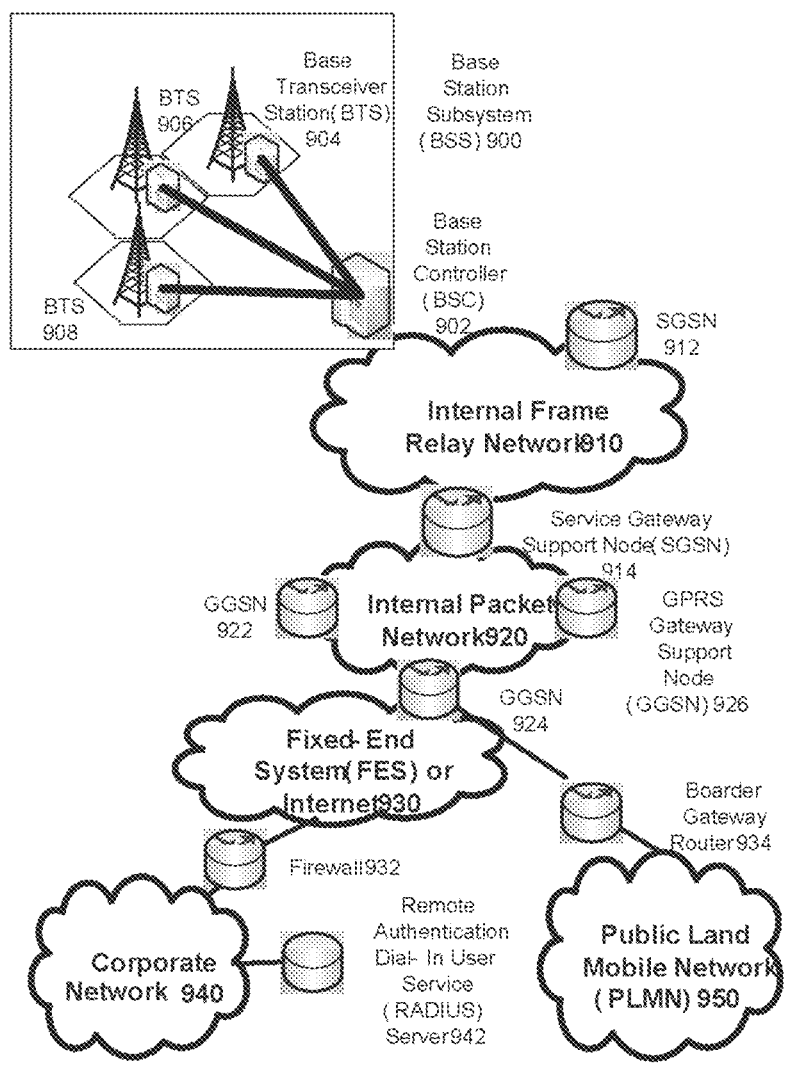
FIG. 6 is an overall block diagram of an exemplary packet-based mobile cellular network environment, such as a GPRS network, in which the present subject matter may be implemented.

FIG. 6 depicts an overall block diagram of an exemplary packet-based mobile cellular network environment, such as a GPRS network, in which systems providing user names for network addresses such as those described herein can be practiced. In an example configuration, network 103 may be encompassed by the network environment depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., device 102) become connected to the wireless network. In exemplary fashion, the packet traffic originating from user devices (e.g., device 102 and device 104) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932; and PLMN 950 may be connected to GGSN 924 via boarder gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
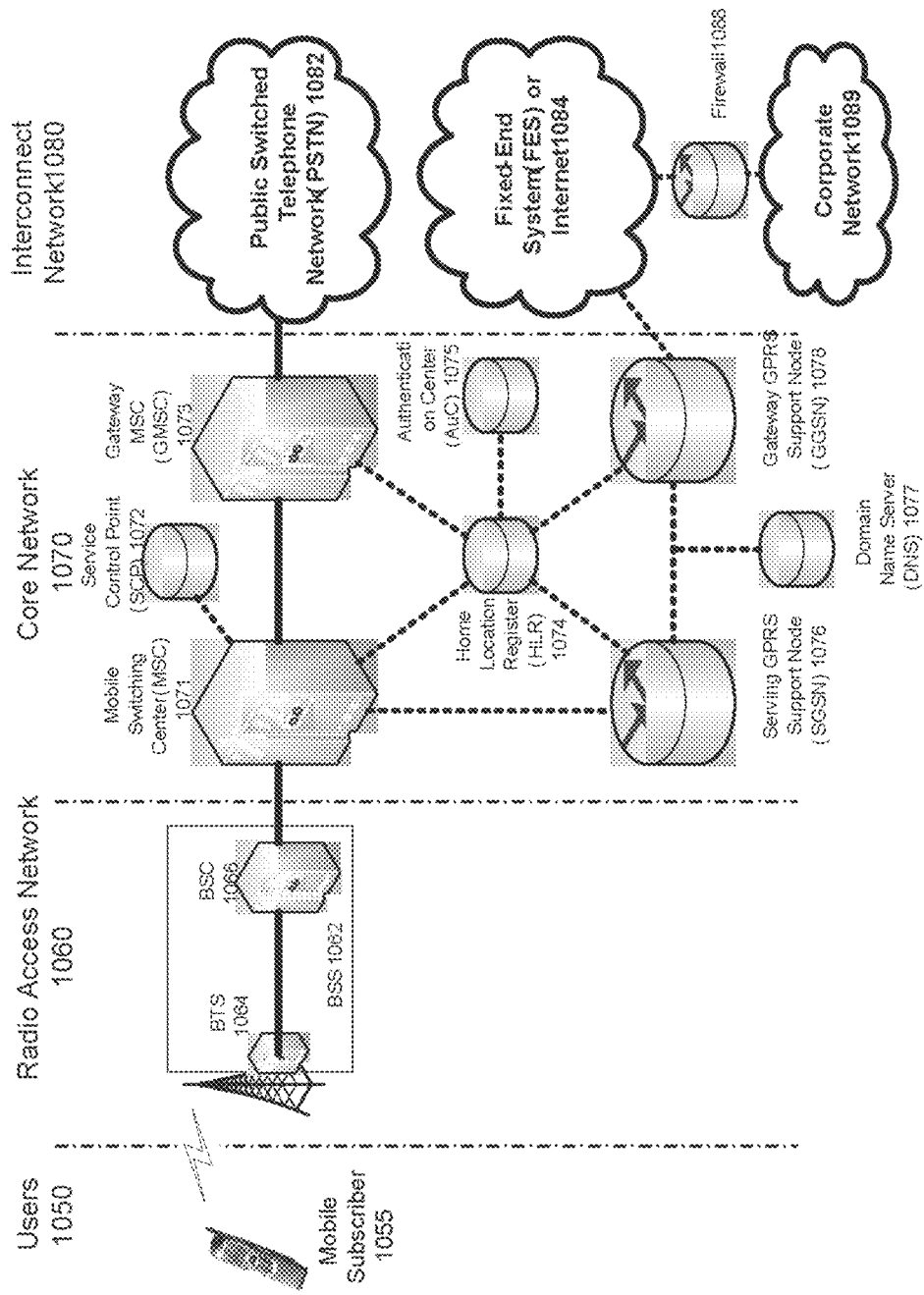
FIG. 7 illustrates a non-limiting, exemplary architecture of a typical GPRS network as segmented into four groups.

FIG. 7 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 7). In an example embodiment, the device depicted as mobile subscriber 1055 may comprise device 102 and/or device 104. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as device 102, used by an end user of the mobile cellular service. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of message systems and methods for providing user names for network addresses such as those described herein can include but are not limited to Gateway GPRS Support Node tables, Fixed End System router tables, firewall systems, VPN tunnels, and any number of other network elements as required by the particular digital network.

Figure 8:
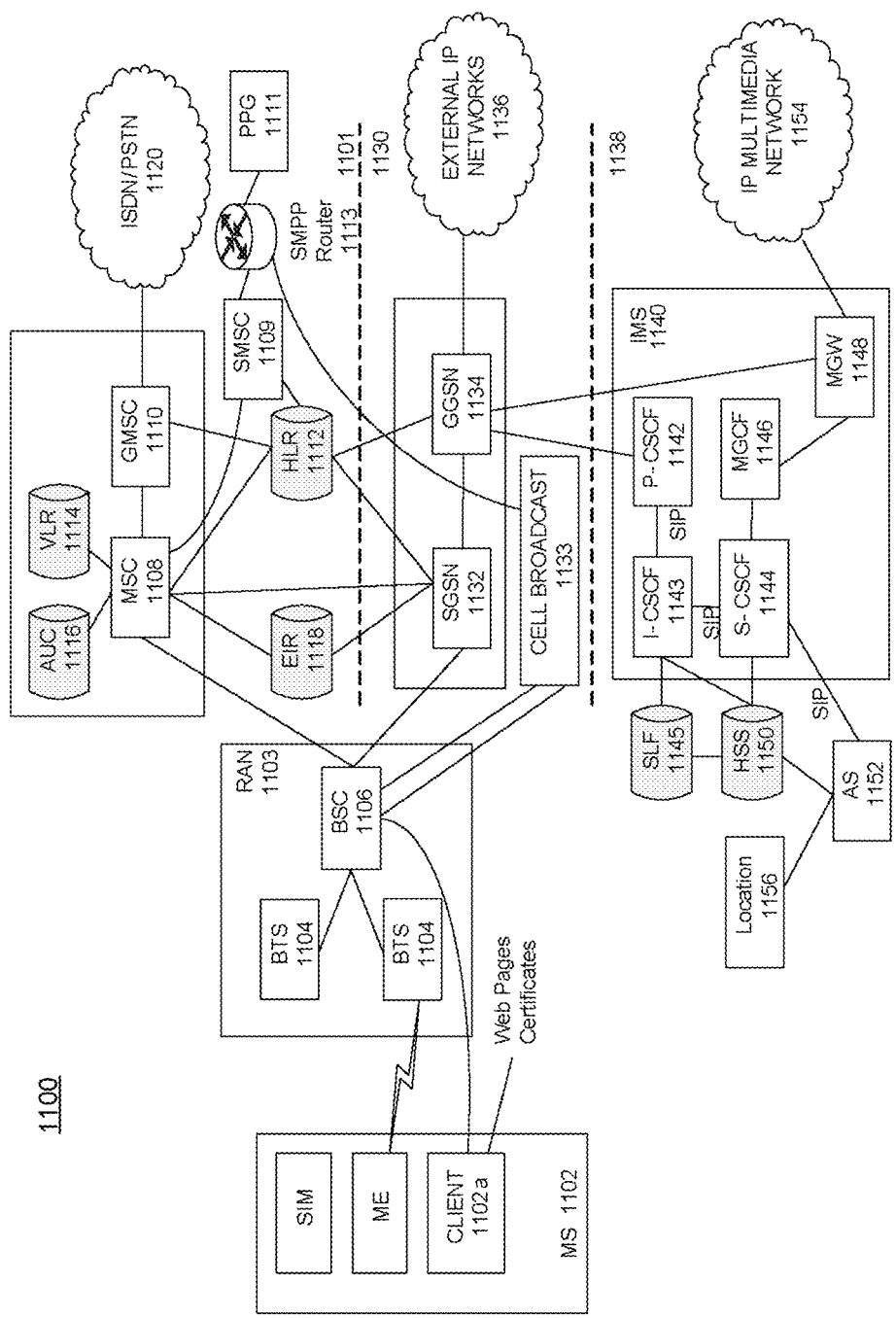
FIG. 8 illustrates a non-limiting alternate block diagram of an exemplary GSM/GPRS/IP multimedia network architecture in which the present subject matter may be implemented.

FIG. 8 illustrates another exemplary block diagram view of a GSM/GPRS/IP multimedia network architecture 1100 in which systems providing user names for network addresses such as those described herein can be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., device 102) that is used by mobile subscribers, with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. Such information may also include address book data and/or message forwarding preferences for each subscriber. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The VLR may also contain address book data and/or message forwarding preferences for each subscriber. The HLR 1112 and the VLR 1114, together with the MSC 1108, may provide the call routing and roaming capabilities of GSM, as well as message forwarding functionality. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, short message service (SMS), and multimedia message service (MMS), the MS may first register with the network to indicate its current location by performing a location update and IMSI attach procedure. The MS 1102 may send a location update including its current location information to the MSC/VLR, via the BTS 1104 and the BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

The GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

A Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

The GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM core network 1101, the GPRS network 1130 as well as the IP multimedia network 1138.

The IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSSs 1150 are present. The S-CSCF 1144 may perform the session control services for the MS 1102. This includes routing originating sessions to external networks and routing terminating sessions to visited networks. The S-CSCF 1144 may also decide whether an application server (AS) 1152 is required to receive information on an incoming SIP session request to ensure appropriate service handling. This decision is based on information received from the HSS 1150 (or other sources, such as an application server 1152). The AS 1152 may also communicate to a location server 1156 (e.g., a Gateway Mobile Location Center (GMLC)) that provides a position (e.g., latitude/longitude coordinates) of the MS 1102.

The HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

The MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) The MGW 1148 may also communicate with other IP multimedia networks 1154.

While example embodiments systems and methods providing user names for network addresses such as those described herein have been described in connection with various computing devices/processors, the underlying concepts can be applied to any computing device, processor, or system capable of implementing the systems and methods for providing user names for network addresses described. The various techniques described herein can be implemented in connection with hardware or software or, where appropriate, with a combination of both. Thus, the methods and apparatuses for the systems and methods for providing user names for network addresses, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for a system for providing user names for network addresses. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for providing user names for network addresses as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus a message forwarding system. When implemented on a general-purpose processor, the program code combines with the processor to provide a unique apparatus that operates to invoke the functionality of a message forwarding system. Additionally, any storage techniques used in connection with a message forwarding system can invariably be a combination of hardware and software.

While the systems and methods for providing user names for network addresses have been described in connection with the various embodiments of the various figures, it is to be understood that other similar embodiments can be used or modifications and additions can be made to the described embodiments for performing the same function message forwarding without deviating from the described systems and methods. For example, one skilled in the art will recognize that a system providing user names for network addresses as described in the present application may apply to any environment, whether wired or wireless, and may be applied to any number of such devices connected via a communications network and interacting across the network. Therefore, systems providing user names for network addresses such as those described herein should not be limited to any single embodiment, but rather should be construed in breadth and scope in accordance with the appended claims. These and other changes can be made to the invention in light of the above detailed description. In general, in the following claims, the terms used should not be construed to limit the invention to the specific embodiments disclosed in the specification and the claims, but should be construed to include all networked digital messaging systems that operate under the claims. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed:

1. A computer-readable storage medium that is not a propagating signal, the computer-readable storage medium comprising executable instructions that when executed by a processor cause the processor to effectuate operations comprising:
    storing a user name associated with a portion of a network address in a storage component in a mobile device;
    storing information identifying Message Service messages from the network address as one of billable or nonbillable;
    receiving, by the mobile device, a Message Service message from the network address, the network address being included as an Originator address in a transfer Protocol User Data Header;
    extracting, by the mobile device, the portion of the network address from the received Originator address in the transfer Protocol User Data Header;
    searching the storage component in the mobile device for said extracted portion of the network address;
    determining, by the mobile device, the user name associated with said extracted portion of the network address;
    displaying the Message Service message and the user name on the mobile device display; and
    displaying information identifying the Message Service message as one of billable or nonbillable.

2. The computer-readable storage medium of claim 1, wherein:
    the network address comprises an alphanumeric string with N characters;
    the portion of the network address comprises an alphanumeric string with M characters;
    N and M are positive integers; and
    M is less than or equal to N.

3. The computer-readable storage medium of claim 1, wherein:
    the network address comprises ten numeric characters; and
    the portion of the network address comprises the first five numeric characters of the network address.

4. A computer-readable storage medium that is not a propagating signal, the computer-readable storage medium comprising executable instructions that when executed by a processor cause the processor to effectuate operations comprising:
    associating a user name with a portion of a network address;
    instructing a mobile device to store the portion of the network address and associated user names in a storage component of the mobile device;
    instructing the mobile device to store information identifying Message Service messages as one of billable or nonbillable;
    instructing the mobile device to display the user name associated with the portion of network address in Message Service message displays in the mobile device when the mobile device receives a Message Service message having the network address as an Originator address in a transfer Protocol User Data Header; and
    instructing the mobile device to display information identifying the Message Service message as one of billable or nonbillable.

5. The computer-readable storage medium of claim 4, the operations further comprising instructing the mobile device to store the portion of the network address and associated user names in a hidden directory in a storage component of the mobile device.

6. The computer-readable storage medium of claim 4, wherein:
    the network address comprises an alphanumeric string with N characters;
    the portion of the network address comprises an alphanumeric string with M characters;
    N and M are positive integers; and
    M is less than or equal to N.

7. The computer-readable storage medium of claim 4, the operations further comprising transmitting an executable application to the mobile device.

8. A mobile device comprising:
    a processor; and
    memory coupled to the processor, the memory comprising executable instructions the when executed by the processor cause the processor to effectuate operations comprising:
        associating a user name with a portion of a network address;
        storing the portion of the network address and associated user names in a storage component of the mobile device;
        storing information identifying Message Service messages as one of billable or nonbillable;
        displaying the user name associated with the portion of network address in Message Service message displays in the mobile device when the mobile device receives a Message Service message having the network address as an Originator address in a transfer Protocol User Data Header; and
        displaying information identifying the Message Service message as one of billable or nonbillable.

9. The mobile device of claim 8, the operations further comprising storing the portion of the network address and associated user names in a hidden directory in a storage component of the mobile device.

10. The mobile device of claim 8, wherein:
    the network address comprises an alphanumeric string with N characters;
    the portion of the network address comprises an alphanumeric string with M characters;
    N and M are positive integers; and
    M is less than or equal to N.

11. The mobile device of claim 8, the operations further comprising transmitting an executable application to the mobile device.

\* \* \* \* \*